United States Patent [19]

Finnegan et al.

[11] Patent Number: 4,867,362
[45] Date of Patent: Sep. 19, 1989

[54] MULTIPURPOSE CAR-TOP RACK

[75] Inventors: Robert J. Finnegan, Williston; Keith L. Prescott, Cambridge, both of Vt.

[73] Assignee: The Shelburne Corporation, Shelburne, Vt.

[21] Appl. No.: 225,166

[22] Filed: Jul. 28, 1988

[51] Int. Cl.$^4$ .......................... B60R 9/04; B60R 9/12
[52] U.S. Cl. ................................ 224/319; 224/315; 224/321; 224/324; 224/329; 296/37.7; 280/727; 280/814
[58] Field of Search ............ 224/917, 273, 42.01, 224/309, 315, 318, 319, 324, 329, 330, 331, 323, 321; 211/70.5; 296/37.7; 248/503; 280/727, 814

[56] References Cited

U.S. PATENT DOCUMENTS

| | | | |
|---|---|---|---|
| 3,638,844 | 2/1972 | Bronson | 224/319 |
| 3,836,058 | 9/1974 | Penniman et al. | 224/315 |
| 3,848,785 | 11/1974 | Bott | 224/319 |
| 4,261,496 | 4/1981 | Mareydt et al. | 224/315 |
| 4,312,467 | 1/1982 | Kulwin | 224/315 |
| 4,432,480 | 2/1984 | Kimmel | 224/329 |
| 4,516,709 | 5/1985 | Bott | 224/315 |
| 4,720,031 | 1/1988 | Zimmerman | 224/323 |
| 4,765,521 | 8/1988 | Finnegan | 224/315 |

FOREIGN PATENT DOCUMENTS 3539288 5/1987 Fed. Rep. of Germany ...... 224/917

*Primary Examiner*—Ernest G. Cusick
*Attorney, Agent, or Firm*—Hopgood, Calimafde, Kalil, Blaustein & Judlowe

[57] ABSTRACT

The invention contemplates, as an article of manufacture, an article-retaining adapter unit which, without requiring tooling of any kind is securely and removably attachable to an installed rack bar on an automobile roof. The adapter unit may be one of several different adapter units, each of which is dedicated to a different specific purpose, for example, one adapter unit for carrying skis, and another for carrying a sailboard. In each case, the adapter unit comprises an elongate base bar, equipped with hook structure at one end for skewed inserting engagement to an existing rack bar, the skew being such that once the inserting engagement has been made, the elongate base bar can be manipulated to nonremovable retention when brought into close parallel relation with the existing rack bar. And when thus oriented parallel to the existing rack bar, clamp structure at the other end of the base bar is firmly securable to the rack bar, to complete the mounting. Hingedly articulating structure carried by the base bar is selectively openable and lockable (1) to retain the article or articles to be carried and (2) to conceal any access to adjustable structure when in locked condition.

15 Claims, 3 Drawing Sheets

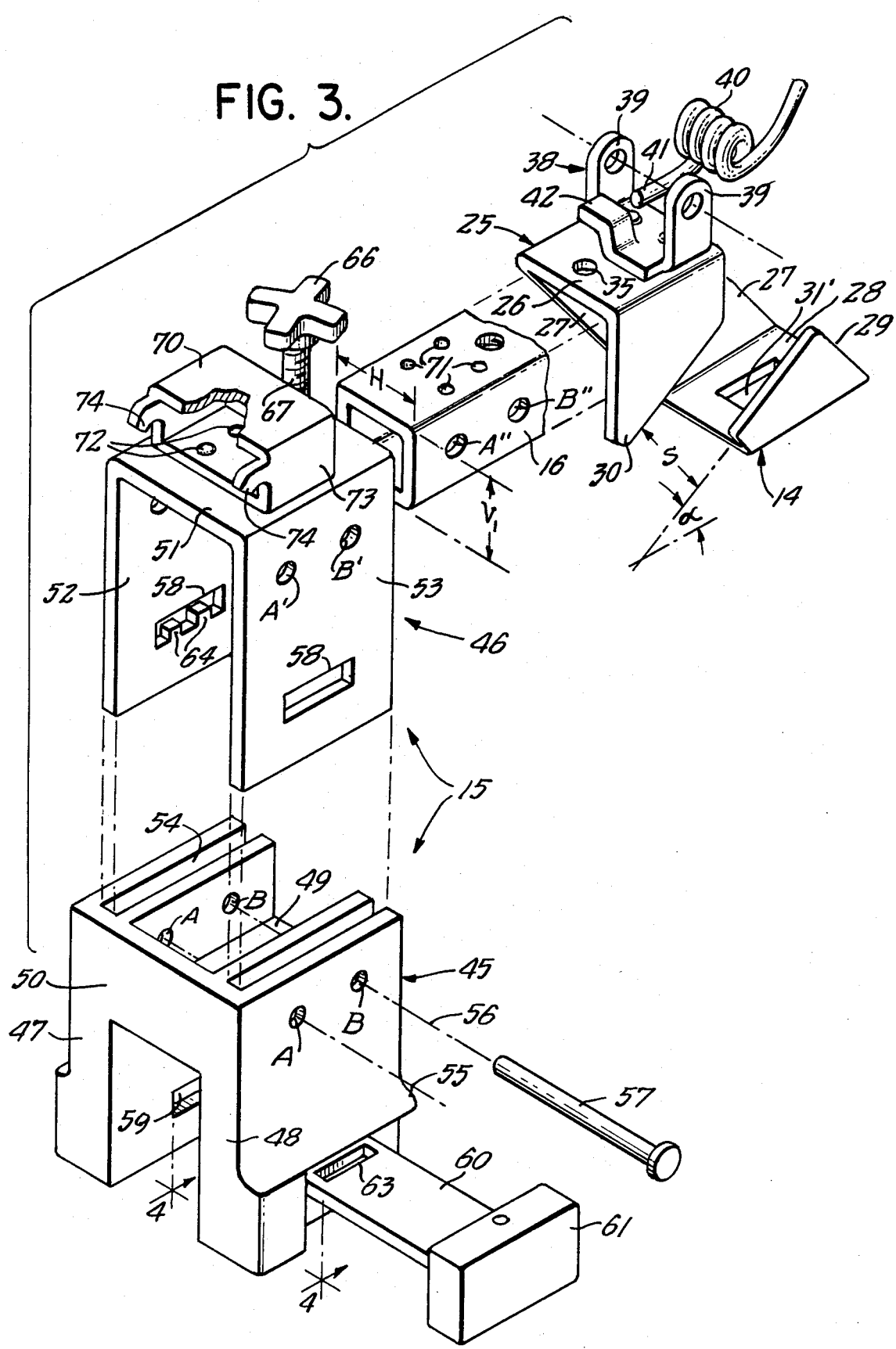

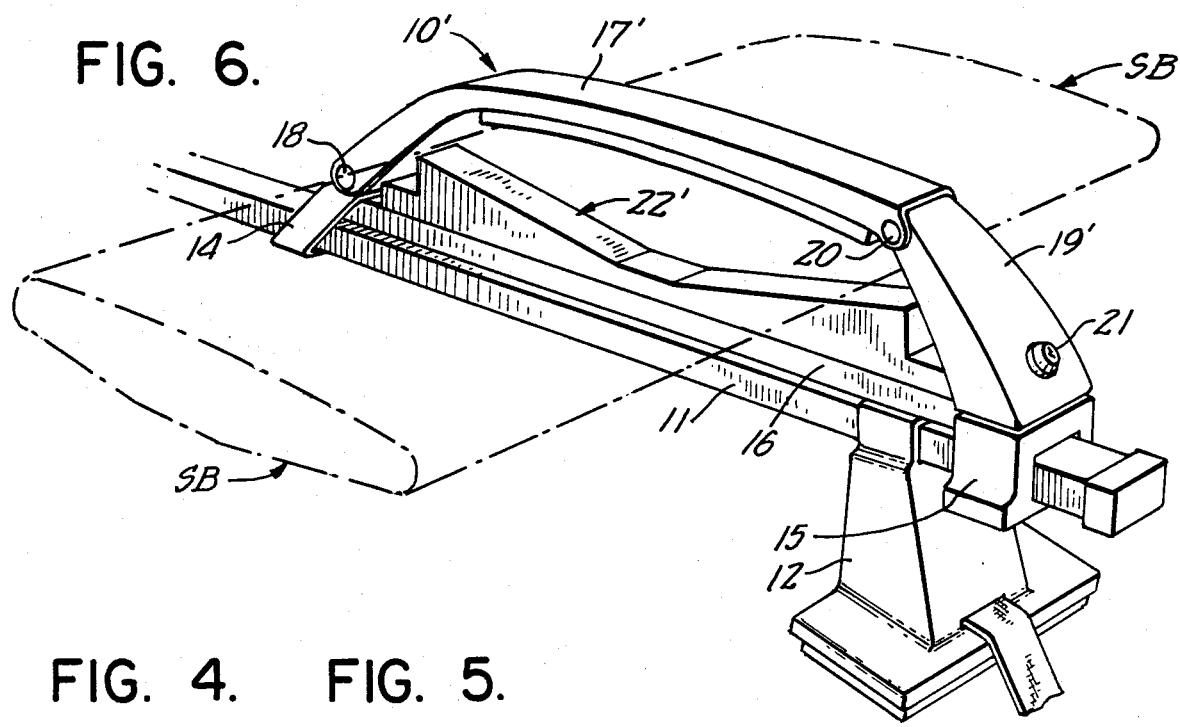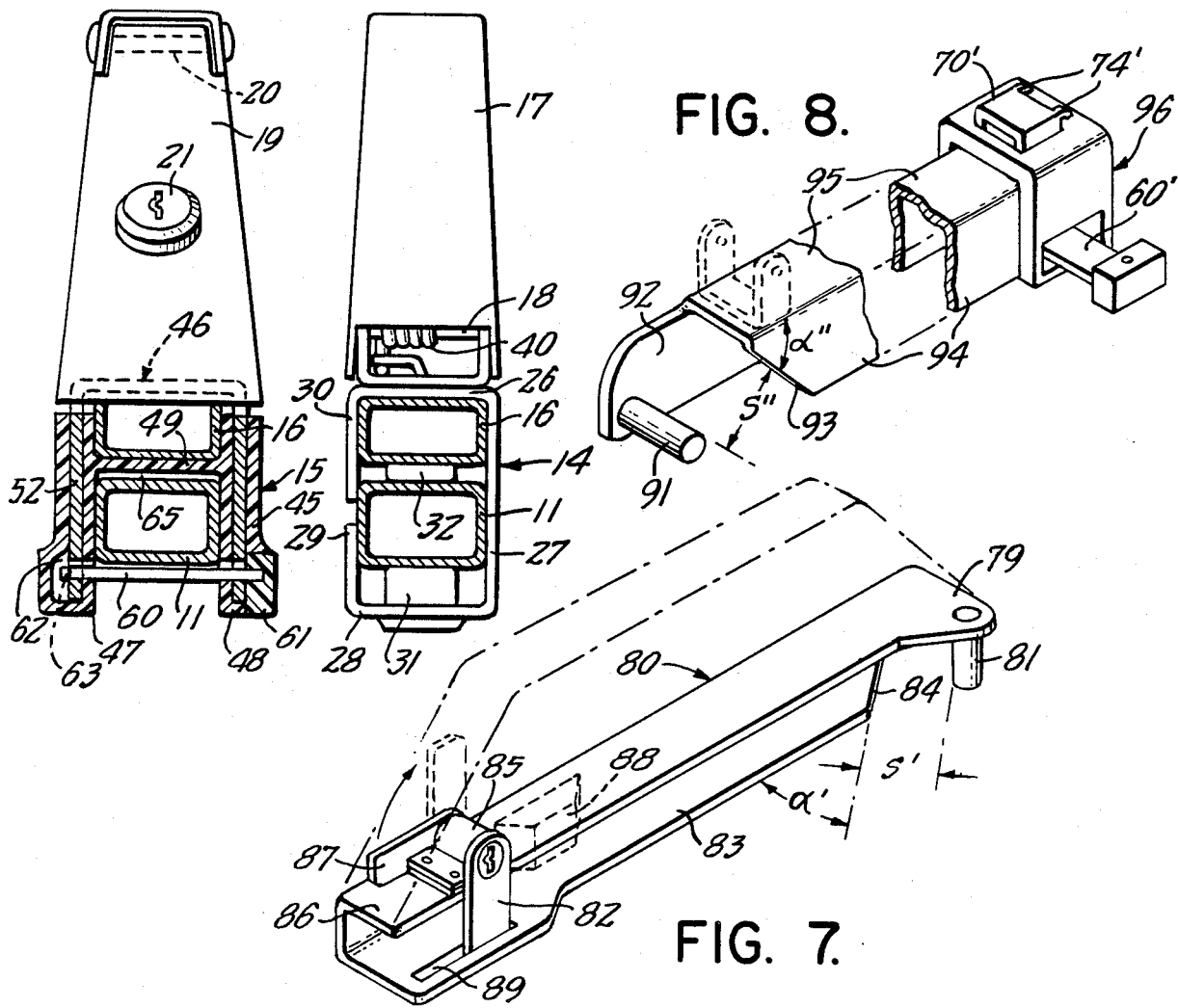

MULTIPURPOSE CAR-TOP RACK

BACKGROUND OF THE INVENTION

The invention relates to car-top racks, for carrying skis, ski-poles, oars or the like.

Generally speaking, roof-rack carrying devices that are commercially available are dedicated to single-purpose end use. For example, such racks for carrying skis are primarily only usable for such purpose, being dependent upon a single elongate bar which extends the width of the car roof, is pedestal-mounted at its ends, and fixedly carries the ski-retaining or other special-purpose fittings appropriate for the particular end use.

Copending application Ser. No. 056,808 (now U.S. Pat. No. 4,765,521) recognizes the problem of having a roof-rack system, such as that of Pat. 4,586,638, serve purposes other than merely such a single purpose as the retention of skis, but the solution of said copending application depends upon a locked cable-wrapping envelopment of the involved articles, which is not particularly to be desired from the point of view of security, nor does such a scheme provide optimum retention of skis or other articles.

BRIEF STATEMENT OF THE INVENTION

It is an object of the invention to provide improved means for car-roof retention of a variety of different kinds of articles.

It is a specific object to provide as an article of manufacture, an adapter unit which is readily and removably attachable to an existing rack bar, the adapter unit being one of a plurality of adapter units, each of which is specifically dedicated primarily to the carrying of different particular articles, such as skis using one adapter unit, or such as a rowing shell using another adapter unit.

Another specific object is to meet the above objects with adapter-unit base construction which is detachably mountable to an existing rack bar, without requiring use of any tools, and which nevertheless provides key-lockable security for articles retained by the thus-mounted adapter unit.

A further specific object is to meet the above object with adapter-unit structure which is detachably mountable at any desired location along the length of an existing rack.

A still further specific object is to provide adapter-unit structure of the character indicated wherein all adjustable components are fully concealed and, therefore, inaccessible to tampering when in installed and locked condition.

The invention achieves the foregoing objects and provides further features of utility in an adapter unit which has an elongate base bar, equipped with hook structure at one end for skewed inserting engagement to an existing rack bar, the skew being such that once the inserting engagement has been made, the elongate base bar can be manipulated to non-removable retention when brought into close parallel relation with the existing rack bar. And when thus oriented parallel to the existing rack bar, clamp structure at the other end of the base bar is firmly securable to the rack bar, to complete the mounting. Hingedly articulating structure carried by the base bar is selectively openable and lockable (1) to retain the article or articles to be carried and (2) to conceal any access to adjustable structure when in locked condition.

BRIEF DESCRIPTION OF THE DRAWINGS

The invention will be described in detail in conjunction with the accompanying drawings, in which:

FIG. 3 is an exploded isometric view of mounting structural components at the respective longitudinal ends of the adapter unit of FIGS. 1 and 2;

FIG. 4 is an end elevation, partly in vertical section to show structural relationships at the lockable end of the adapter unit of FIGS. 1 and 2;

FIG. 5 is an end elevation, partly in vertical section to similarly show relationships at the opposite end of the adapter unit of FIGS. 1 and 2;

FIG. 6 is a simplified view in perspective of adapter-unit structure, modified from FIG. 1, for carrying a sailboard; and FIGS. 7 and 8 are perspective views of two further embodiments of the base member of an adapter unit of the invention.

DETAILED DESCRIPTION OF PREFERRED EMBODIMENTS

Figure 1:
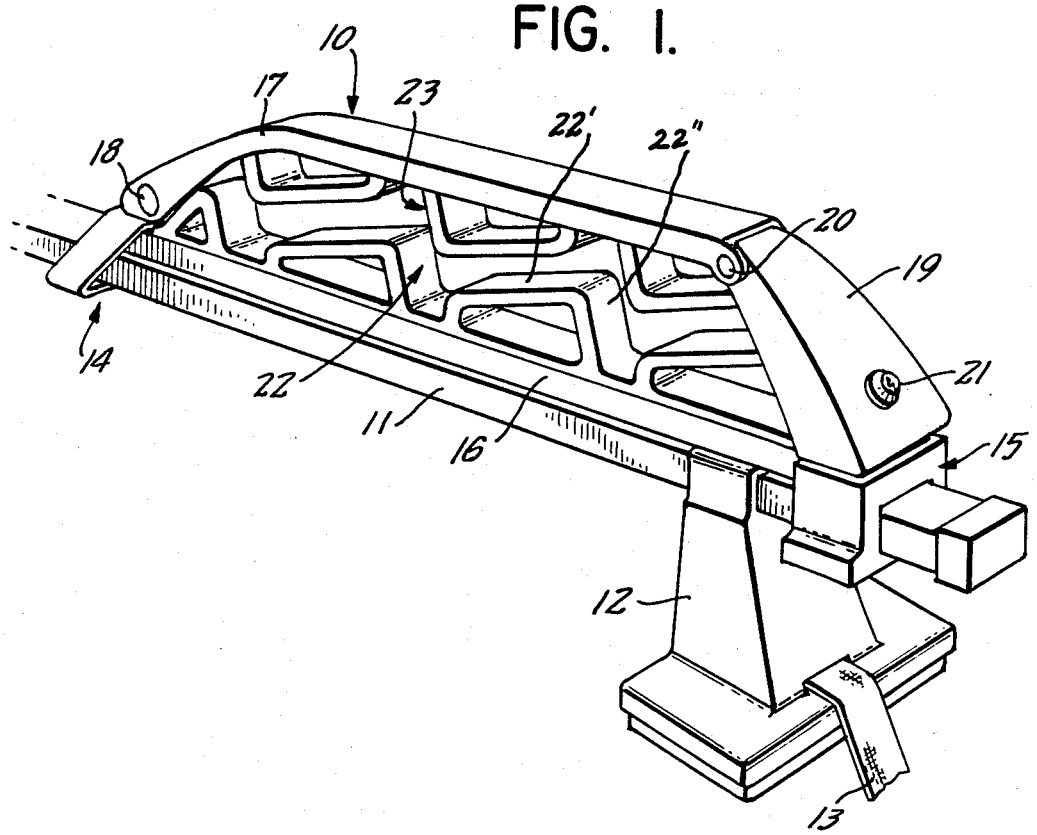
FIG. 1 is a view in perspective of an adapter-unit structure of the invention, in installed and locked condition at one end of a car-top rack bar, and dedicated to ski-carrying.

In FIG. 1, the invention is shown in application to an adapter unit 10 removably securable to the elongate bar 11 of installed rack structure. Bar 11 is of constant sectional contour which happens to be rectangular and of length spanning an automobile roof, and mounted in vertical offset from the roof via end pedestals, only one (12) of which is shown. The rack structure 11, 12 may be as described in Pat. No. 4,586,638, with a laterally extending anchor strap 13 adapted to engage the nearby edge of a door frame (not shown). For purposes of the present invention, the rack structure 11, 12, 13 may be considered to be in permanently installed assembly to the automobile, and generally this rack structure is one of two like structures, spanning the roof width at spaced forward and rear locations of the roof.

Figure 2:
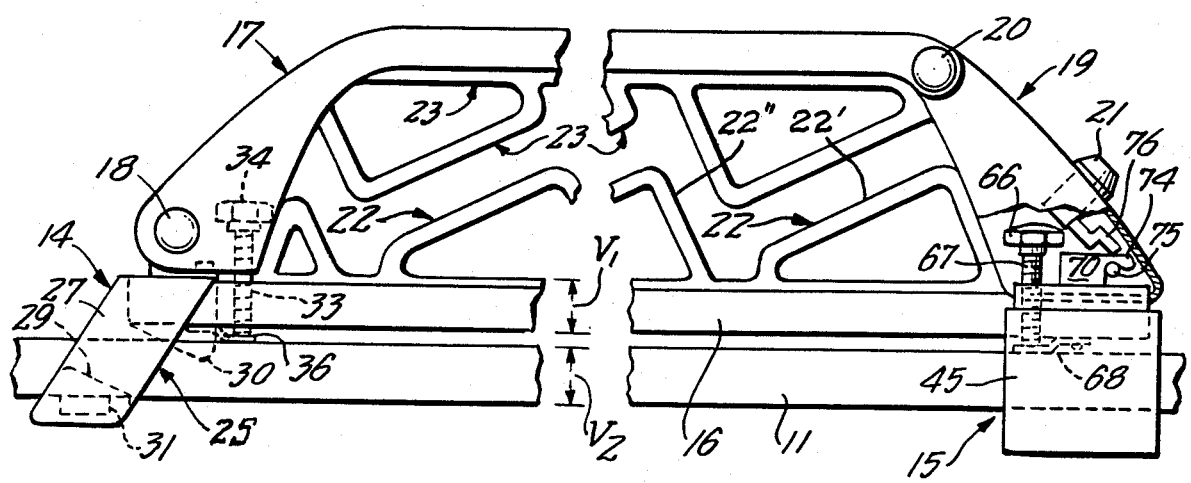
FIG. 2 is a side view in elevation, centrally broken away to reveal construction at the longitudinal ends of the adapter unit of FIG. 1.

In accordance with a feature of the invention, the adapter unit 10 is a complete self-contained article of manufacture which is readily capable of removably secured assembly to the rack bar 11, at any desired location along the length of bar 11, being here shown with distal and proximal end-attachment means 14, 15 for attachment to bar 11 and spanning the location of pedestal (12) support of the rack bar 11. The adapter unit 10 essentially comprises an elongate base member 16 to which each of the end-attachment means 14, 15 is secured, and the remainder of the adapter unit is devoted to completion of an openable enclosure of one or more articles retained within such enclosure. As shown in FIGS. 1 and 2, the removable enclosure is completed by a double-articulated link system, comprising a first elongate dog-leg link or closure bar 17, the short arcuate end of which has pivoted connection 18 to the distal end-attachment means 14, and a second link 19, pivotally connected at 20 to the proximal end of link 17, and in generally arcuate conformance to the arcuate end of link 17, for detachable connection to the proximal end-attachment means 15; key-operated means 21 secures the mounting of adapter unit 10 to rack bar 11, by selectively preventing detachment of the connection of link 19 to the end-attachment means 15.

As also shown in FIGS. 1 and 2, the enclosure defined by base member 16 and links 17 and 19 is dedicated to the retention of skis, by lower and upper locating inserts 22, 23, having plural confronting formations which define an individual clamp for each one of a plurality of pairs of skis, each ski pair being retained at an acute angle to the horizontal. The lower insert 22 is seen as providing an upwardly open ski-locating formation for each pair of skies; in each such formation, a first and longer support slope 22' is inclined at 20 to 30 degrees to the elongate dimension of base member 16, and there is an adjacent second and shorter support slope 22'', and said slopes 22'-22'' generally define an inverted V support configuration. The lower ski-locating insert 22 may be an injection-molded product of suitable plastic material such as polypropylene, fastened as by rivets to the upper face of base member 16, here shown to be of rectangular sectional profile. The upper ski-locating insert 23, which is shown with a ski-clamping profile complimentary to and confronting the profiling 22'-22'' of insert 22, may also be an injection-molded product, but preferably acts as a snubber and is thus of a yieldable elastomeric material such as KRATON, a thermoforming-rubber product of Shell Oil Company; by forming the elongate horizontal portion of link 17 as a downwardly open channel, with slightly inturned flanges at the lower edges of channel sidewalls, it will be understood that the upper insert 23 may be formed for snap-action permanent retention or for selective retention of an alternative or replacement insert 23, relying upon such inturned flanges for retaining the assembly of the insert to and within the downwardly open side of the channel.

Referring now to FIGS. 2, 3 and 5, the distal end-attachment means 14 is seen to comprise a stiff, rugged bracket 25, as of relatively heavy gauge steel, of generally hook-shape configuration, such that a span S is developed between parallel edge limits which define an opening that is skewed at an angle $\alpha$ to the horizontal and through which initial engagement to rack bar 11 is permitted. More specifically, the hook configuration of bracket 25 comprises an upper laterally extending course or platform 26 by which bracket is secured to the upper surface of base member 16, a downwardly and distally extending slanted course 27 which laps the vertical dimensions $V_1$ and $V_2$ of both base member 16 and rack bar 11, and a bottom laterally extending course 28 which laps the horizontal dimension H that is shown common to base member 16 and to rack bar 11. The bottom laterally extending course 28 terminates at an upturned end flange 29 having a slanted upper edge, at angle $\alpha$ to the horizontal, and the upper laterally extending course or platform 26 terminates at a downturned end flange 30 having a slanted lower edge, also at angle $\alpha$ to the open lateral aspect of a gap, of horizontal and cooperating with flange 29 to define the span S. A resilient pad or snubber 31 as of KRATON is formed with a suitable detent-action, stud for snap-in reception in a pierced opening 31' in the bottom course 28, and thereby at least in part lining the bottom course 28; a protective pad or shim 32 (as of polypropylene) is similarly retained in the bottom face of base member 16 to provide limited nonmarring glide-action spacing between bar member 16 and rack bar 11 at the distal engagement end of member 16.

Initial engagement of base member 16 (and, therefore, of adapter unit 10 in its entirety) to rack bar 11 is made by orienting base member 16 to the elevation angle $\alpha$, so that the span S is horizontal or at least accords with orientation of rack bar 11, whereby rack bar 11 acceptably receives adapter 10, by lateral-aspect insertion via the open lateral aspect of the gap of span S, upon lateral inserting displacement of adapter 10. Once fully inserted, the flanges 29, 30 are poised to lap the hitherto-unlapped sidewall of rack bar 11, when and as base member 16 is lowered into closely spaced horizontal orientation above rack bar 11. In the process of bringing base member 16 to its lowered position, it will be understood that resilient pad 31 engages and is to a degree compressed, so that pads 31, 32 develop a firm, non-rattling squeeze at their points of distal-end engagement to rack bar 11.

To finally clamp the distal-end engagement, the threaded shank 33 of an adjustment knob 34 passes through an aperture 35 in the upper course 26 of bracket 25 and is advanceable in aligned tapped holes in the upper and lower walls of base member 16 to adjustably clamp a shoe element 36 against the upper wall of rack bar 11, it being noted that shoe 36 may be a suitably bent piece of thin stainless-steel spring stock carried at the bottom wall of base member 16. The clamped setting of shank 33 against rack bar 11 (via shoe 36) relieves pad 33 of engagement to the rack bar 11 and increases the grip of the distal engagement, through increased compression of pad 31. But such clamping should be deferred until proximal-end attachment has been accomplished.

To complete the description of distal-end connections, a bracket 38 with spaced upstanding ears 39 is formed out of or secured to the upper course 26 of bracket 25; as shown, two apertures in the base of bracket 38 will be understood to align with registering apertures in base member 16 and in upper course 26, for secure permanent riveting assembly of brackets 38 and 25 to base member 16. The upstanding ears of bracket 38 are pierced on the alignment of pivot pin 18, for articulating connection of the curved end of the enclosure link 17. Finally, a relatively stiff coil spring 40 locates on pivot pin 18, between ears 38, with one tangential end 41 engaged by a keeper-lug formation 42 of bracket 38, while the other tangential end 43 extends vertically up, for engagement against the inner closure wall of the channel-configured section of link 17. Thus related, the nature of spring 40 is to resiliently urge link 17 with upward pivoting action, i.e., in the direction to open the enclosure of articles embraced by formations 22, 23.

The nature of proximal end-attachment means 15 will be best understood by reference to FIGS. 2, 3 and 4. Said means 15 is shown to comprise an injection-molded plastic chair component 45, as of high-impact polypropylene, and a bracket component 46, as of the relatively heavy-gauge steel used for the distal bracket 25. The chair component 45 is seen in FIGS. 3 and 4 to comprise two upstanding side members or arms 47, 48 which are laterally spaced to straddle the horizontal dimension H of rack bar 11. These side members are integrally united by a horizontal panel 49 by which chair 45 can derive seating support from rack bar 11. The horizontal panel 49 is positioned at substantially the vertical extent $V_1$ beneath upper limits of side members 47, 28, to enable seating and locating accommodation of the proximal end of base member 16, and an upstanding outer-end panel 50 extends upward from the horizontal seating panel 49, being integrally united therewith and with both of the side members 47, 48.

The bracket component 46 is of inverted generally U-shape, being defined by an upper panel or bridge 51 between like side panels 52, 53, and deep-slot cavities 54 in each of the side members 47, 48 are designed to receive the inserted full vertical extent of the respective side panels 52, 53. As seen in FIG. 3, the outer vertical face of chair component 45 is smooth and continuous with panel 50, closing cavities 54 against external exposure; and as seen in FIG. 4, the lower ends of cavities 54 are also closed, but cavities 54 are nevertheless sufficiently deep to accommodate full insertion of the bracket side panels 52, 53.

When the proximal end of base member 16 is fully nestled within the inner volume defined by and between panels 49, 50 and side members 47, 48, and when bracket side panels 52, 53 are fully received in the cavities 54 of side members 47, 48, there is lateral registry of openings on two spaced axes 55, 56, for insertional acceptance of elongate rivet or the like means 57 for permanently securing this relationship of components 16, 45, 46; in FIG. 3, the registering openings are marked A, A', and A" for the axis-55 alignment, and B, B', B" for the axis-56 alignment. Also in the circumstance of riveting alignments on axes 55, 56, a further laterally extending alignment is established for a series of rectangular slots 58 (in the bracket side panels 52, 53) and 59 (in the side members or arms 47, 48). As seen in FIG. 4, these slots permit selectively operable connection of arms 47, 48, by sliding lateral insertion of a locking plate or bar 60 as of relatively heavy-gauge steel. The locking plate 60 is shown equipped with an enlarged head 61 for ready manual manipulation, and when fully inserted, its remote end extends beyond slot 58 of bracket side panel 52 but is fully contained within a local pocket region 62 of the cavity 54 of side member 47. At this remote end, the locking plate 60 is locally pierced to define a transverse locking slot 63, engageable over upstanding lug or tooth formations 64 in slot 58 of bracket panel 52. When fully inserted, as in FIG. 4, plate 60 engages panel 58 at 63/64 and completes the enclosure of the full section of rack bar 11, with provision for at least a small vertical clearance 65 with the underside of the horizontal panel 49 of chair component 45; of course, when chair component 45 seats on rack bar 11, the clearance 65 exists for free and easy passage of the locking plate 60 beneath rack bar 11.

The provision for clamped engagement of the proximal end-attachment means 15 to rack bar 11 may be generally as described for the distal end-attachment means 14. Thus, a knob 66 with a threaded shank or jack screw 67 may pass through vertically aligned apertures in bracket panel 51, upper and lower panels of base member 16 and panel 49 of the chair component 45, there being a tapped threaded engagement of shank 67 to at least one of the upper and lower panels of base member 16. And a clamp shoe 68 (similar to shoe 36), suspended as by rivet attachment to the underside of panel 49 and/or base member 16, is the means of applying clamp pressure (from threaded advance of shank 67) to the upper surface of rack bar 11. Continued downward advance of shank 67 upwardly jacks chair component 45 away from seating engagement at panel 49, to a binding engagement of locking plate 60 to the underside of rack bar 11. In the establishment of this binding engagement, the steel locking plate 60 is driven against the lower edge of each of the bracket side-panel slots 58, so that locking lug formations 64 are positive assurance against any attempted removal of locking plate 60. On the other hand, a mere backing-off manipulation of knob 66 relaxes the clamp, and allows chair panel 49 to seat on rack bar 11, thus enabling easy retraction of locking plate 60.

Description of the proximal end-attachment means 15 is completed by identifying an auxiliary bracket 70 illustratively having riveted attachment to the upper bracket panel 51 and to the upper panel of base member 16, the latter being suggested in FIG. 3, by openings 71 for rivets or bolts 72; suitably, bracket 70 is cut from elongate tubular stock of rectangular section, but in FIG. 3 the upper panel thereof is cut-away to reveal inner detail. Upstanding sides 73 of bracket 70 feature downwardly open hook formations 74 for selective engagement to a transverse latch pin 75 which permanently spans the side plates of the channel section of the short arcuate link 19. Finally, as seen in FIG. 2, key operation of lock 21 will be understood to swing the dog or tang 76 thereof between the locked position shown, wherein tang 76 effectively traps pin 75 within the hook formation 74, and an unlocked position wherein the trapped condition has been removed.

In operation, and assuming that the adapter unit 10 of FIG. 1 has been stowed in locked condition and must now be mounted to the installed rack bar 11 on a vehicle roof, the unit 10 need only be oriented to the skew elevation angle $\alpha$, for laterally inserted acceptance of the rack bar dimension $V_2$ via span S between flange formations 29, 30 of the distal end-attachment means 14. Upon then swinging unit 10 downward to parallel relation of base member 16 to rack bar 11, the flanges 29, 30 positively locate the distal end from loss of rack-bar engagement and, having first removed the sliding locking plate 60, the proximal end-attachment means 15 may locate upon the rack bar 11, being seated via panel 49, whereupon the locking plate 60 may be immediately reinserted to the fullest extent. Key insertion and actuation of lock 21 will swing tang 76 away from bracket 70, and with relatively light application of downward force applied to the proximal end of dog-leg link 17, the hook formations 74 become disengaged from locking pin 75, and the small proximal link 19 can be swung outward, thus allowing spring 40 to drive link 17 (and, therefore, also link 19) to an acute angle of elevation, with ski-locating supports of insert 22 exposed for loading. However, before any such loading, the location of adapter unit 10 on the rack bar 11 should be securely anchored at both ends 14, 15, by downward threaded advance of both knob shanks 33, 67. When one or a plurality of pairs of skis has been nested into individual support formations of insert 22, links 17, 18 may be pulled down, with the ski-engaging formations of insert 23 in resiliently loaded engagement with such ski pairs as have been accommodated. A little more applied downward force at or near pivot 20 will allow locking pin 75 to reenter the hook formations 74, and the loaded skis are fully locked to the vehicle when key operation at 21 resets tang 76 against the top panel of bracket 70. It is to be noted that key access is now the only means of access to the means of rack-bar attachment and clamping, in that side walls of the channel section of both links 17, 19 foreclose any access to either of the clamp-setting knobs 34, 66.

It has been explained above that the attachment unit 10 with its ski-locating inserts 22, 23 represents but one example of dedicating the unit 10 to a special purpose, it being understood that a similar adapter unit 10 is also employed at a second rack bar (not shown) on the vehicle roof. The unit 10 can also be dedicated to other special purposes, as to accommodate fishing poles, oars, paddles and the like, merely by snap-in, snap-out or other removable attachment of suitably contoured other such inserts. And FIG. 6 illustrates that a similar such adapter unit 10", which differs from unit 10 only in respect of the greater vertically arched span of its article-receiving enclosure (and also in respect of its article supporting inserts 22', 23') may provide for secure retention of a sailboard, surfboard, rowing shell or other more bulky article section; such a different article section (e.g., for a sailboard) is suggested by phantom outlines SB in FIG. 6. Thus, in FIG. 6, the only different structure may be in the vertically enclosing profiles of links 17', 19', and in the suitably contoured inserts carried by link 17' and by base member 16. Rack-bar engagement and key locking procedures remain as described for adapter unit 10.

Much as the described structure for distal-end attachment is presently preferred, it should be understood that other techniques may be employed for skew insertion and locking (without tools), without departing from the scope of the present invention. For example, an adapter unit may rely upon an elongate base member 80, as shown in FIG. 7, wherein member 80 is a laterally open channel configured to nest against one vertical side and against both upper and lower horizontal sides of rack bar 11, being retained against the other vertical side by a rugged pivot arm or stud 81 at the distal end, and by a lever-actuable pawl 82 at the proximal end. Specifically, at the distal end, one of the channel walls of base member 80 has a laterally protruding ear 79 to which stud 81 is securely fixed, and the other channel wall 83 is truncated at 84, at a skew angle $\alpha'$ to the longitudinal edge of wall 83, the location of stud 81 with respect to truncation 84 being such as to establish a skewed span S' for skewed insertional accommodation of the horizontal dimension H of the rack-bar section. At the proximal end, the pivoted pawl 82 is journalled in a bearing 85 that is fixed to or formed out of the upper wall 86 of base member 80, and an actuating lever 87 therefor is arranged to lie flat against wall 86 when pawl 82 is in retained engagement to the rack bar 11, a resilient snubber or pad 88 on the vertical or base wall of the channel being compressed to resiliently load the engagement when pawl 82 is in its down position; as shown, in its down position, the outer end of pawl 82 is laterally captive in a slot formation 89 of the lower channel wall 83. It will be understood that suitable article-enclosing and locating means (suggested by phantom outline), selectively lockable as disclosed in connection with FIGS. 2 to 5, may be mounted to base member 80, also with deep channel skirts of articulated links, to protect against hostile tampering with either of the end-attachments 81, 82 of FIG. 7.

FIG. 8 illustrates another variation wherein the elongate base member is a channel (90) and wherein distal-end engagement to a rack bar 11 is via the slot width S" between a stud 91 (carried by a first flank 92 of the channel) and the truncated edge 93 of the opposite flank 94 of the channel. The truncated edge slopes at acute angle $\alpha''$ from the elongatation axis of the channel, for skewed lateral adaptation to rack bar 11 while channel 90 is elevated at angle $\alpha''$ with respect to the rack bar. Once then lowered so that flanks 92, 94 snugly embrace both vertical sides of the rack bar, the top surface 95 of the channel seats on the top surface of the rack bar, with stud 91 engaging the bottom surface of the rack bar. At the proximal (i.e., locking end), a bracket 70' (as described in connection with FIG. 3) will be understood to be secured to the top surface 95 of the channel, with its hook-shaped formations 74' projecting for removable connection to articulated article-enclosing structure (not shown). Also at the proximal end, a molded-plastic saddle 96 engages over channel and is locally open on its upper side, to permit location with respect to bracket 70', with hook formations 74' projecting for the indicated removable connection; and a locking plate 60' is insertable through transversely aligned slots (not shown) in saddle 96 and in channel flanks 92, 94, beneath the bottom surface of the rack bar, to retain proximal-end engagement to the rack bar, in a manner that is analogous to the locking-plate (60) function described in connection with FIG. 3. At the distal end, it will be understood that bracket structure, shown only by phantom outline but analogous to the structure 38 of FIG. 3, may be fixed to the distal end of the top surface 95 of the channel, to provide distal-end pivot-pin location for an articulated article-enclosing linkage system.

What is claimed is:

1. As an article of manufacture, an article-carrying adapter that is selectively applicable to an existing elongate multiple-purpose car-top mounted rack bar of uniform section having a vertical dimension and a horizontal dimension, said adapter comprising an elongate rigid member with first rack-engageable means at one end and second rack-engageable means at the other end; said first rack-engageable means comprising bracket means secured to said member and defining generally a hook-shaped configuration having a downwardly extending course of extent sufficient to lap a first lateral aspect of said vertical dimension and a bottom laterally extending course of extent sufficient to lap said horizontal dimension, the bottom laterally extending course terminating at an end formation which is at vertically spaced offset beneath said rigid member so as to define a characterized lateral-aspect gap at a second and opposite lateral aspect of said vertical dimension and between confronting contours of said rigid member and of said one end; said lateral-aspect gap being such as to enable lateral-aspect rack-bar insertional reception of the hook-shaped configuration of said bracket means only for a rigid-member orientation that is acute-angle related to the elongate dimension of the rack bar, and said lateral-aspect gap being further such that when said rigid-member orientation is thereafter reduced to parallel relation with the elongate dimension of the rack bar, said first rack-engageable means is fully engaged to the rack bar; said second rack-engageable means including means selectively securable to the rack bar to complete the stabilized removable engagement of said adapter to the rack bar.

2. The article of claim 1, in which said elongate rigid member carries one or more upwardly open ski-locating formations extending upwardly from said rigid member when in secured relation with the rack bar.

3. The article of claim 2, in which said ski-locating formation is one of a plurality of like ski-locating formations that are longitudinally arrayed along said elongate rigid member.

4. The article of claim 2, in which said ski-locating formation comprises a first support slope inclined at 20 to 30 degrees to the elongate dimension of said rigid member, and an adjacent second and shorter support slope inclined at approximately 90 degrees to said first slope, said first support slope being longer than said second support slope, said first and second slopes defining an upwardly directed V support.

5. The article of claim 3, in which each of said ski-locating formations comprises a first support slope inclined at 20 to 30 degrees to the elongate dimension of said rigid member, and an adjacent second support slope inclined at approximately 90 degrees to said first slope, said first support slope being longer than said second support slope, said first and second slopes defining an upwardly directed V support, said ski-locating formations being integral formations of a single same injection-molded plastic component of said elongate rigid member.

6. The article of claim 2 or claim 3, in which said elongate rigid member further includes an elongate closure bar having hinged connection to said elongate rigid member at said one end, and having releasable connection to said elongate rigid member at said other end, said closure bar being above said ski-locating formations and substantially parallel to said elongate rigid member when connected at said other end.

7. The article of claim 2 or claim 3, in which said elongate rigid member further includes an elongate closure bar having hinged connection to said elongate rigid member at said one end, and having releasable connection to said elongate rigid member at said other end, said closure bar being above said ski-locating formations and substantially parallel to said elongate rigid member when connected at said other end, and at least one elastomeric ski-engaging snubber carried on the underside of said closure bar and projecting into an upwardly open portion of a ski-locating formation.

8. The article of claim 1, in which said second rack-engageable means comprises two laterally spaced arms depending from said other end of said elongate rigid member, said arms being spaced to embrace the rack bar, and selectively operable arm-connection means engaged to one of said arms and engageable to the other of said arms and beneath the rack bar.

9. The article of claim 8, wherein selective engagement of said arms establishes a loose engagement to the rack bar, with said arm-connection means in clearance relation with the rack bar, and selectively operable means including a jack screw carried by said other end of the elongate rigid member and oriented for jack-screw compressive action against the rack bar to take up the clearance at the loose engagement, to the point of tightly securing said other end to the rack bar.

10. The article of claim 9, wherein said adapter further includes an elongate closure bar having hinged connection to said elongate rigid member at said one end, and having releasable connection to said rigid member at said other end, said closure bar being in vertically spaced relation above said elongate rigid member and substantially parallel to said elongate rigid member when connected at said other end, the releasably connectable end of said closure bar being in the form of a channel having spaced side walls which effectively cover said jack screw and prevent actuating access to said jack screw when connected to said elongate rigid member at said other end.

11. The article of claim 10, and at least one downwardly projecting elastomeric article-engageable snubber carried by the underside of said closure bar when said closure member is connected to said other end.

12. The article of claim 1, in which said bracket means is at least in part lined with an elastomeric snubber for squeezed compression between said bracket means and the rack bar in the course of reducing the acute-angle relation to said parallel relation.

13. As an article of manufacture, a ski-carrying adapter that is selectively applicable to an existing elongate multiple-purpose car-top mounted rack bar of uniform section having a vertical dimension and a horizontal dimension, said adapter comprising an elongate rigid member with first rack-engageable means at one end and second rack-engageable means at the other end; said first rack-engageable means defining a first hook-shaped configuration having a downwardly extending course of extent sufficient to lap a first lateral aspect of said vertical dimension and a bottom laterally extending course at lateral extent at least to partially lap said horizontal dimension, said second-rack engageable means defining a second hook-shaped configuration having a downwardly extending course of extent sufficient to lap the other lateral aspect of said vertical dimension and a bottom laterally extending course of extent sufficient at least partially to lap said horizontal dimension, said bottom laterally extending courses being longitudinally spaced by at least the horizontal dimension of the rack bar, so as to define a bottom-aspect gap which enables bottom-aspect rack-bar insertional reception of the hook-shaped configuration of said first rack-engageable means only for initial rigid-member orientation that is acute-angle related to the elongate dimension of the rack bar, and said bottom-aspect gap being such that when said rigid-member orientation is thereafter reduced to parallel relation with the elongate dimension of the rack bar, said first rack-engageable means is fully engaged to the rack bar; said second rack-engageable means including means selectively securable to the rack bar to complete the stabilized removable engagement of said adapter to the rack bar.

14. The article of claim 1 or claim 13, in which said first rack-engageable means includes a selectively operable jack screw carried by said one end of the elongate rigid member and oriented for jack-screw compressive action against the rack bar to clamp the rack bar securely against the bottom laterally extending course of said bracket means.

15. As an article of manufacture, an article-carrying adapter that is selectively applicable to an existing elongate multiple-purpose car-top mounted rack bar of uniform rectangular section having a vertical dimension and a horizontal dimension, said adapter comprising an elongate rigid channel member having longitudinally spaced ends and a bottom wall and sidewalls spaced by said bottom wall, the space between sidewalls according with one of said dimensions for insertable nested reception of the rack bar in the channel member; said bottom wall and one of said sidewalls at one end of said channel member being cut-away, and a stud formation fixed to the other of said sidewalls and extending parallel to said bottom wall and at offset from the geometric plane of said bottom wall, said offset being to at least the extent of the other of said dimensions, said stud formation being spaced from the cut-away end of said one side wall to define a gap to at least the extent of said other dimension; whereby, with the channel member at an acute angle to the rack bar, said one end of said channel member may be assembled to the rack bar by first presenting the gap for lateral-aspect insertional reception of said other dimension of the rack bar and by then reducing the acute-angle relation to a nested relation of the rack bar in said channel member; article-locating means carried by said channel member between the respective ends thereof; and rack-engageable means carried by the other end of said channel member and selectively securable to the rack bar to complete the stabilized removable engagement of said adapter to the rack bar.

* * * * *